United States Patent [19]

Nojiri et al.

[11] 4,247,667

[45] Jan. 27, 1981

[54] METHOD OF CROSSLINKING POLY-α-OLEFIN SERIES RESINS

[75] Inventors: Akio Nojiri, Yokohama; Takashi Sawasaki; Toshio Koreeda, both of Tokyo, all of Japan

[73] Assignee: The Furukawa Electric Co., Ltd., Tokyo, Japan

[21] Appl. No.: 15,859

[22] Filed: Feb. 27, 1979

[30] Foreign Application Priority Data

Mar. 3, 1978 [JP] Japan .................. 53-23602

[51] Int. Cl.$^3$ .................. C08F 8/00; C08F 8/42; C08C 19/00
[52] U.S. Cl. .................. 525/254; 525/265; 525/342
[58] Field of Search .................. 525/265, 254

[56] References Cited

U.S. PATENT DOCUMENTS

3,646,155  2/1972  Scott .................. 260/827

FOREIGN PATENT DOCUMENTS

1542543  3/1979  Australia .................. 525/254

*Primary Examiner*—William F. Hamrock

*Attorney, Agent, or Firm*—Frishauf, Holtz, Goodman & Woodward

[57] ABSTRACT

A method of crosslinking poly-α-olefin series resins, comprising the steps of subjecting a resin composition to graft reaction under a volume ratio of oxygen to the resin composition set at less than 0.1 and at temperatures ranging between the thermal decomposition temperature of the radical generating agent and 230° C., said composition comprising at least one kind of poly-α-olefin series resin of polypropylene series resin, poly(butene-1) series resin or poly(4-methyl pentene-1) series resin; a radical generating agent of dibenzoyl peroxide or t-butyl perbenzoate; and a silane compound having the general formula of RR'SiY$_2$, where "R" is a monovalent olefinically unsaturated hydrocarbon group or hydrocarbonoxy group, "Y" is an organic group capable of hydrolysis, and "R'" is a monovalent hydrocarbon group except aliphatic unsaturated hydrocarbon groups, or the group "Y" or "R" defined above, and bringing the resultant graft polymer into contact with water so as to cause crosslinking reaction under the action of a silanol condensation catalyst added to the reaction system before or after the graft reaction step.

15 Claims, No Drawings

METHOD OF CROSSLINKING POLY-α-OLEFIN SERIES RESINS

This invention relates to a method of crosslinking poly-α-olefin series resins except polyethylene and ethylene-based copolymers, in particular, to a method of crosslinking propylene-based polymers which involves the use of a silane compound.

A method involving the use of an azide compound is popular for chemically crosslinking polypropylene. It is also known to the art to employ a method involving the use of dicumyl peroxide and a polyfunctional monomer for chemically crosslinking polypropylene. However, the crosslinking agent used in each of these prior arts has a low decomposition temperature, resulting in that a crosslinking reaction is caused by the heat required in the extrusion molding step, etc. Naturally, the occurrence of crosslinking reaction renders it impossible to apply extrusion molding to such a polypropylene composition.

Japanese Patent Publication No. 1711/73 discloses a method of crosslinking polyethylene or ethylene-based polymers which involves the use of a silane compound. The silane compound mentioned has the general formula:

$$RR'SiY_2$$

where,

"R" is a monovalent olefinically unsaturated hydrocarbon group or hydrocarbonoxy group, "Y" is an organic group capable of hydrolysis, and "R'" is a monovalent hydrocarbon group except aliphatic unsaturated hydrocarbon groups, or the group "R" or "Y" defined above.

To be more specific, the silane compound and an organic peroxide are added to a polymer, followed by heating so as to cause graft reaction. Finally, water is introduced into the reaction system so as to cause crosslinking reaction under the action of silanol condensation catalyst added to the reaction system before or after the graft reaction step, thereby obtaining the desired product of crosslinked polymer.

The method outlined above is very interesting when it comes to the production of crosslinked polyethylene or an crosslinked ethylene-based copolymer containing at least 50% by weight of ethylene component. But, it is impossible to obtain a highly crosslinked material by applying this method to poly-α-olefin series resins such as polypropylene, poly(butene-1) and poly(4-methyl pentene-1).

The present invention provides a novel method of crosslinking poly-α-olefin series resins, particularly of crosslinking polypropylene series resin.

According to the present invention, there is provided a method of crosslinking poly-α-olefin series resins, comprising the steps of subjecting a resin composition to graft reaction under a volume ratio of oxgyen to the resin composition set at less than 0.1 and at temperatures ranging between the thermal decomposition temperature of the radical generating agent and 230° C., said composition comprising at least one kind of poly-α-olefin series resins selected from the group consisting of polypropylene series resin, poly(butene-1) series resin and poly(4-methyl pentene-1) series resin; a radical generating agent selected from the group consisting of dibenzoyl peroxide and t-butyl perbenzoate; and a silane compound having the general formula of RR'SiY₂, where "R" is a monovalent olefinically unsaturated hydrocarbon group or hydrocarbonoxy group, "Y" is an organic group capable of hydrolysis, and "R'" is a monovalent hydrocarbon group except aliphatic unsaturated hydrocarbon groups, or the group "Y" or "R" defined above, and bringing the resultant graft polymer into contact with water so as to cause crosslinking reaction under the action of a silanol condensation catalyst added to the reaction system before or after the graft reaction step.

In the graft reaction step of the present invention, the silane compound is grafted to the poly-α-olefin series resin so as to provide a graft polymer.

The following experiment conducted by the present inventors have led to the present invention.

Specifically, 2 phr of γ-methacryloyloxypropyltrimethoxy silane, 0.2 phr of dibenzoyl peroxide and 0.2 phr of silanol condensation catalyst were added to and fully mixed with an isotactic polypropylene powder having a melt index of 1.0 and a particle size of not larger than 80 mesh. 2 g of the polypropylene composition thus prepared was housed in each of three glass tubes each having an inner diameter of 15 mm and a length of 70 mm, followed by sealing the upper opening of the glass tube with the tube interior kept at a vacuum of 0.5 torr. (the volume ratio of oxygen: about 0.001). Likewise, two unsealed sample tubes (the volume ratio of oxygen: about 0.25) were also prepared.

The three sealed sample tubes were subjected to heating for 15 minutes at 120° C., 180° C. and 220° C., respectively. On the other hand, the two unsealed sample tubes were heated for 15 minutes at 120° C. and 180° C., respectively. After the heating by which the dibenzoyl peroxide contained in the composition was sufficiently decomposed and graft reaction was carried out, the sample tubes were maintained at 200° C. for 10 minutes so as to provide a uniform mass of the molten composition. Then, the molten sample was taken out of the tube and immersed in boiling water for 4 hours for carrying out crosslinking reaction. Finally, the reaction mixture was immersed for 6 hours in tetralin kept at 135° C. for measuring the gel fraction of the substance insoluble in tetralin. The following table shows the results of the experiment.

| Sample No. | Graft Condition | Gel Fraction (%) |
| --- | --- | --- |
| 1 | 0.5 torr.; 120° C.; 15 min. | 45 |
| 2 | 0.5 torr.; 180° C.; 15 min. | 70 |
| 3 | 0.5 torr.; 220° C.; 15 min. | 64 |
| 4 | atmospheric; 120° C.; 15 min. | 21 |
| 5 | atmospheric; 180° C.; 15 min. | 4 |

The above table shows that the crosslinking reaction is facilitated if the graft reaction is carried out under low oxygen concentration state and at high temperature.

An additional experiment was conducted by using the polypropylene composition used in the preceding experiment except that various radical generating agents besides dibenzoyl peroxide were added to the composition. In this case, the graft reaction was carried out at 190° C. under nitrogen atmosphere by using an extruder. The graft occurrence was measured for each of the samples. Then, the crosslinking reaction was carried out and the gel fraction obtained as in the preceding experiment. The following table shows the results of the experiment.

| Sample No. | Radical Generating Agent | Graft* Occurrence | Gel Fraction |
|---|---|---|---|
| 6 | azobisisobutyronitril, 0.5 phr | 63% | 42% |
| 7 | dibenzoyl peroxide, 0.5 phr | 87% | 83% |
| 8 | t-butyl perbenzoate, 0.5 phr | 78% | 67% |
| 9 | dicumyl peroxide, 0.5 phr | 93% | 21% |
| 10 | 2,5-dimethyl-2,5-di(t-butyl peroxy) hexyne-3, 0.5 phr | 72% | 11% |
| 11 | cumenehydroperoxide, 0.5 phr | 43% | 5% |

*Graft occurrence of each of the resultant samples was measured by employing gas chromatography. Specifically, the non-grafted silane compound was extracted first from the reaction mixture by using a dried benzene, followed by cooling the extracted solution. Finally, gas chromatography was applied to the cooled solution, thereby obtaining graft occurrence of the sample.

The above table shows that the higher graft reaction does not necessarily lead to the higher gel fraction, i.e., to the higher crosslinking reaction. It should be pointed out in particular that the graft reaction performed in the case of using dibenzoyl peroxide is very effective for promoting the subsequent crosslinking reaction, resulting in a high percentage of gel fraction.

These experiments suggest that, where a silane compound is grafted to polypropylene, it is important to select a suitable organic peroxide as the radical generating agent, a suitable reaction atmosphere and a suitable reaction temperature in the graft reaction step in order to make the subsequent crosslinking reaction advantageous. It has not yet been clarified sufficiently why the graft reaction carried out under the particular conditions is effective for promoting the subsequent crosslinking reaction. But, it is supposed that the particular conditions mentioned permit the graft reaction to take place uniformly in the polymer matrix without giving rise to deterioration reactions, leading to the promotion of the subsequent crosslinking reaction.

The present invention is applicable to polypropylene series resin, poly(butene-1) series resin and poly(4-methyl pentene-1) series resin. The resins suitable for the present invention include, for example, polypropylene, propylene—another α-olefin copolymer containing 50% by weight or more of propylene component, poly(butene-1), and poly(4-methylpentene-1). It is desirable to use a resin which does not contain water because the water causes hydrolysis of the silane compound contained in the resin composition and consequently causes undesired crosslinking reaction. Particularly suitable for the present invention is a random or block copolymer of propylene and ethylene containing 1 to 15% by weight of ethylene component. In this case, it is possible to produce a crosslinked material with improved low-temperature brittleness and impact resistance.

The silane compound used in the present invention has the general formula:

RR'SiY₂ where,
"R" is a monovalent olefinically unsaturated hydrocarbon group or hydrocarbonoxy group,
"Y" is an organic group capable of hydrolysis, and
"R'" is a monovalent hydrocarbon group except aliphatic unsaturated hydrocarbon groups or the group "R" or "Y" defined above.

The group "R" defined above includes, for example, vinyl, allyl, butenyl, cyclohexenyl, cyclopentadienyl, $CH_2=C(CH_3)COO(CH_3)_3—$, $CH_2=C(CH_3)COOCH_2CH_2O(CH_2)_3—$, and $CH_2=CHCOO(CH_2)_3—$. Particularly suitable in terms of graft efficiency is a hydrocarbonoxy group having at least one acryloyloxy group or methacryloyloxy group such as γ-acryloyloxypropyl group. Also, a silane compound having a vinyl group is preferred in terms of molding property of the resin composition.

The group "Y" defined above includes, for example, alkoxy groups such as methoxy, ethoxy, and butoxy groups; acyloxy groups such as acetoxy and propionoxy groups; oxime groups such as $—ON=C(CH_3)_2$, $—ONCCH_3C_2H_5$, and $—ON=C(C_6H_5)_2$; and substituted amino groups such as $—NHCH_3$, $—NHC_2H_5$ and $—NH(C_6H_5)$.

It is preferred to use a large amount of the silane compound such as 0.5 to 20 phr, desirably, 2 to 20 phr in order to alleviate the influence given by oxygen.

In the present invention, dibenzoylperoxide or t-butyl perbenzoate is used as the radical generating agent in an amount of 0.05 to 10 phr, preferably, 0.1 to 2.0 phr. If the amount of the radical generating agent is unduly small, the graft reaction does not proceed sufficiently. On the other hand, an unduly large amount of the radical generating agent brings about an excessive density of crosslinkages. In this case, the crosslinked material fails to exhibit satisfactory properties.

Dibenzoylperoxide is particularly suitable for use in the present invention. Specifically, this compound provides a considerably stable radical under relatively high temperature in spite of its relatively low decomposition temperature, resulting in that the radical performs hydrogen abstraction reaction in the melting and kneading step of the resin composition. It follows that dibenzoylperoxide serves to bring about uniform graft reactions, leading to an improved crosslinking efficiency.

It is preferred to add the radical generating agent to the reaction system in the form of a solution prepared by dissolving the agent in a suitable organic solvent like, for example, dioctylphthalate or silicone oil. Naturally, the radical generating agent can be uniformly dispersed into the resin composition or added in the form of a solution, leading to a high crosslinking efficiency. Further, a solution can be handled with safety. Still further, the radical generating agent added to the reaction system in the form of a solution serves to improve the appearance of the produced crosslinked material.

In the present invention, the crosslinking reaction is caused by introducing water into the graft polymer matrix in the presence of a silanol condensation catalyst. The water may be introduced by disposing the graft polymer matrix under steam or air atmosphere or by immersing the matrix in hot water housed in a vessel. It is preferred to carry out the crosslinking reaction at elevated temperatures in order to promote the reaction speed.

The silanol condensation catalyst may be added to the resin composition before the graft reaction step, but is added to the composition in general after the graft reaction step. It is preferred to prepare in advance a catalyst master batch containing a high concentration of the silanol condensation catalyst. In this case, the catalyst is added to the graft polymer by mixing the catalyst master batch, followed by fully kneading the mixture. Where the catalyst is added before the graft reaction step, it is necessary to keep the resin composition perfectly free from water.

The silanol condensation catalyst used in the present invention includes, for example, metal carbonates such as dibutyltin dilaurate, dibutyltin diacetate, dibutyltin dioctoate, tin (II) acetate, lead naphthenate, zinc caprylate, iron 2-ethylhexanate and cobalt naphthenate. Other organic metal compounds may also be used as the catalyst including, for example, titanic acid ester such as titanic acid butyl ester and chelate compounds. Further, an organic base, an ethyl aminoic acid, an inorganic acid and a fatty acid may also be used as the silanol condensation catalyst. Particularly suitable for use in the present invention are dibutyltin dilaurate, dibutyltin diacetate and dibutyltin dioctoate. These silanol condensation catalysts are added in an amount of 0.005 to 2.0 phr, preferably, 0.01 to 0.5 phr.

In the present invention, the graft reaction is carried out at temperatures ranging between the thermal decomposition temperature of the radical generating agent added to the resin composition and 230° C. At temperatures lower than the thermal decomposition temperature mentioned, radicals are not generated in the polymer, failing to perform the graft reaction. On the other hand, the grafted silane compound is denatured if the reaction temperature is higher than 230° C. In this case, the subsequent crosslinking reaction can not be performed satisfactorily. Preferably, the graft reaction temperature should be set at 180° to 220° C. In this case, the benzoyloxy free radical generated from the radical generating agent very effectively stabilizes the polymerperoxy free radical which is responsible for the deterioration of the graft polymer, resulting in uniform graft reaction of the graft polymer.

In the present invention, the oxygen concentration in the graft reaction step should be controlled such that the volume ratio of oxygen to the resin composition is maintained at less than 0.1. If the oxygen concentration is higher than the above-mentioned value, polymer deterioration is promoted in the graft reaction step. In addition, denaturation of the silane compound grafted to the polymer is also promoted by oxygen. It follows that the crosslinking efficiency is markedly lowered if the oxygen concentration is high. The higher the oxygen concentration, the more prominent is this tendency.

In order to carry out the graft reaction under a controlled oxygen concentration, it is convenient to use a vessel or a machine which is capable of withdrawing air or substituting an inert gas for air. Where a machine serving to knead a molten composition such as an extruder is used for the graft reaction, it is particularly important to pay attention to the temperature distribution of the machine. For example, it is substantially impossible to keep the oxygen concentration sufficiently low in the feed zone of the extruder. Thus, if the temperature of the feed zone is higher than 180° C., polymer deterioration is markedly promoted, resulting in failure to obtain a satisfactory crosslinked material in the subsequent step. In this case, it is necessary to sufficiently elevate the temperature of the following zones including the compression zone of the extruder so as to decompose most of the radical generating agent.

In view of the requirement of the controlled oxygen concentration, it is necessary to carry out the graft reaction under vacuum or under an inert gas atmosphere such as nitrogen atmosphere. As seen from the experiments reported previously, the presence of oxygen gives detrimental effects to the graft reaction and, consequently, to the subsequent crosslinking reaction.

An extruder is suitable for use in carrying out the graft reaction because the air is withdrawn substantially from the extruder by the back pressure. The air withdrawal is further promoted if the extruder is equipped with a screw having a large compression ratio or with a rapid compression type screw. Of course, the graft reaction can be performed more satisfactorily if the hopper of the extruder is evacuated or nitrogen gas is substituted for the air present in the hopper.

It is possible to calculate the oxygen concentration within the extruder based on the bulk density of the resin composition within the compression zone in which the radical generating agent is decomposed. It has been found through actual measurement of the bulk density mentioned above that the volume ratio of oxygen to the composition should be less than 0.1, preferably, less than 0.05, in order to carry out satisfactory graft reaction.

In conclusion, it is very important in the present invention to pay careful attention to the temperature and oxygen concentration in the graft reaction step.

Where the method of the present invention is employed for crosslinking, for example, polypropylene, the produced crosslinked material is substantially equal in elongation to the raw material polypropylene. In addition, the crosslinked material is superior to the raw material polypropylene in flexibility. It is particularly important to note that the crosslinked material exhibits brittle temperature as low as −50° C. In the present invention, the graft reaction is carried out between the resin and a highly reactive silane compound having high compatibility with the resin, with deterioration of the resin prevented sufficiently. It is supposed that the selection of suitable silane compound and graft reaction condition serves to improve markedly the mobility of the polymer chain of the resin, leading to the prominent effects of the present invention mentioned above.

As described in detail, the present invention provides a method of crosslinking polypropylene series resin, poly(butene-1) series resin and poly(4-methyl pentene-1) series resin. The crosslinked material obtained by the invented method is excellent in flexibility, impact resistance and low-temperature brittleness. It is also important to note that the present invention permits shortening the time required for the crosslinking reaction, which is carried out by immersing the graft polymer in hot water or steam, to a half to one-fourth of that described in the Example of Japanese Patent Publication No. 1711/73 referred to previously. For the case of crosslinking polypropylene series resin, the silane compound is highly compatible with polypropylene series resin, the mobility of the main chain of polypropylene series resin is very high in the graft reaction step, and the graft polymer has long graft chains. These are supposed to bring about excellent properties of the crosslinked material and the short crosslinking time. In other words, the experiments described previously suggest that the present invention permits uniform graft reaction throughout the reaction system to give graft polymer having long graft chains, leading to the good crosslinking reaction in the subsequent step. At any rate, the method of the present invention has rendered it possible to obtain crosslinked polypropylene series resin, etc.

having excellent properties. Naturally, the industrial merit of the present invention is very high.

It is also possible quite naturally to add inorganic fillers such as siliceous sand, glass fiber, and aluminum hydroxide as well as known antioxidant, ultraviolet absorber, fire retardant, lubricating agent, etc. to the poly-α-olefin series resin used in the present invention.

Further, it is possible to produce a crosslinked foam of polypropylene series resin, poly(butene-1) series resin and poly(4-methylpentene-1) series resin having fine cells and high expanding ratio by applying the method of the present invention to the resin selected from the group consisting of polypropylene series resin, poly(butene-1) series resin and poly(4-methylpentene-1) series resin containing a foaming agent.

EXAMPLE 1

2.5 phr of γ-methacryloyloxy propyl trimethoxy silane and 0.4 phr of 50% dioctylphthalate solution of dibenzoyl peroxide were added to a powdery propylene-ethylene block copolymer having melt index of 4 and containing 8% by weight of ethylene component. The composition thus prepared was extruded through a nozzle 2 mm in diameter, of an extruder of single screw type having a diameter of 40 mm and a length-to-diameter ratio (L/D) of 20 with the hopper of the extruder highly purged by nitrogen, thereby obtaining a graft polymer extrudate of pellet shape. The screw of the extruder was a full flight screw of rapid compression type having a compression ratio of 4. The heating zone of the cylinder of the extruder was divided into three equal sections along the length thereof, i.e. into the feed section, compression section and metering section, for the purpose of temperature control. Specifically, the temperature was controlled such that the feed section, compression section, metering section and die section were maintained at 120° C., 180° C. 200° C. and 200° C., respectively.

On the other hand, a catalyst master batch of pellet shape was prepared by extruding a composition consisting of a powdery propylene-ethylene copolymer having a melt index of 1 and containing 8% by weight of ethylene component, 1 phr of dibutyltin dilaurate and 2 phr of antioxidant [Irganox 1010 (trade mark)]. The extruder used was the same as that used for preparing the graft polymer.

A mixture consisting of 90% by weight of the graft polymer and 10% by weight of the catalyst master batch was extruded by using the extruder mentioned above, thereby obtaining an extrudate of strand shape. In this step, the temperatures of the feed section, compression section, metering section and die section of the extruder were maintained at 170° C., 200° C., 200° C. and 200° C., respectively. The resultant extrudate was immersed for 4 hours in hot water maintained at 80° C. so as to carry out the crosslinking reaction.

It was found that the percentage of gel fraction of the crosslinked material was as high as 82%. Further, the extrudate after the crosslinking reaction exhibited a very smooth surface, was 20% lower in Young's modulus than the original copolymer (i.e., the crosslinked extrudate was very flexible), and showed a brittle temperature of as low as −47° C.

CONTROL 1

Crosslinked materials (A) and (B) were obtained in accordance with the procedures followed in Example 1 except that 0.2 phr of dicumyl peroxide was substituted for the dibenzoyl peroxide used in Example 1. In case (A) of control 1, the hopper of the extruder was not purged by nitrogen in the step of preparing the graft polymer. But, nitrogen purge was conducted in case (B) in the graft polymer preparation step.

Gel fractions of the produced crosslinked materials (A) and (B) were found to be as low as 13% and 30%, respectively.

EXAMPLE 2

2.5 phr of γ-methacryloyloxy propyl trimethoxy silane and 0.4 phr of dibenzoyl peroxide were added to powdery isotactic polypropylene having a melt index of 4. The composition thus prepared was extruded by using the extruder used in Example 1 with the hopper of the extruder evacuated to a vacuum of 150 torr., thereby obtaining a graft polymer extrudate of pellet shape. In this step, the temperatures of the feed section, compression section metering section and die section of the extruder were maintained at 100° C., 200° C., 200° C. and 200° C., respectively. The volume ratio of oxygen to the resin composition in the compression part of the extruder was found to be 0.005 in this step of graft reaction.

On the other other hand, a catalyst master batch of pellet shape was prepared by extruding at 200° C. (resin temperature) a composition consisting of a powdery isotactic polypropylene having 1.0 of melt index, 2 phr of dibutyltin dilaurate and 4 phr of antioxidant [Nocrac 300 (trade mark)].

A mixtures consisting of 95% by weight of the graft polymer and 5% by weight of the catalyst master batch was extruded at 200° C. (resin temperature) by using the extruder used for preparing the graft polymer so as to obtain an extrudate of strand shape. The extrudate was immersed for 4 hours in boiling water of 100° C. so as to carry out the crosslinking reaction.

Gel fraction of the crosslinked material was found to be as high as 87%. Further, the heat distortion temperature of the crosslinked material was found to be 120° C. in contrast to 110° C. for the isotactic polypropylene used as the starting material.

CONTROL 2

A crosslinked material was obtained in line with Example 2 except that 0.4 phr of azobisisobutyronitrile was substituted for the dibenzoyl peroxide used in Example 2. In this case, gel fraction of the crosslinked material was as low as 10%. Further, the heat distortion temperature of the crosslinked material was found to be 112° C., which is substantially equal to 110° C. for the raw material polypropylene.

EXAMPLE 3

A composition consisting of propylene-ethylene random copolymer containing 3% by weight of ethylene component and having a melt index of 1.5, 3.2 phr of γ-methacryloyloxy propyl trimethoxy silane and 0.4 phr of t-butyl perbenzoate was fully mixed for 40 minutes at 100° C. by using a Henschel mixer with the interior of the mixer purged by nitrogen, thereby obtaining a graft polymer.

Then, 0.3 phr of dibutyltin dilaurate was added to the graft polymer and the mixture was extruded by using the extruder used in Example 1 so as to obtain an extrudate of strand shape. In this step, the temperature of the feed section, compression section, metering section and die section of the extruder were maintained at 170°

C., 200° C., 200° C. and 200° C., respectively. The extrudate was immersed for 4 hours in hot water maintained at 80° C. so as to carry out the crosslinking reaction.

Gel fraction of the crosslinked material was found to be 79%. Further, the crosslinked extrudate exhibited an elongation of more than 500% and, thus, was highly flexible.

CONTROL 3

A crosslinked material was obtained in line with Example 3 except that 0.4 phr of dipropionyl peroxide was substituted for the t-butyl perbenzoate used in Example 3. In this case, gel fraction of the crosslinked material was as low as 32%.

EXAMPLE 4

Graft polymer was obtained first as in Example 1 by using a composition consisting of poly(butene-1) having a melt index of 4.0, 2.2 phr of γ-methacryloyloxy propyl trimethoxy silane and 0.5 phr of dibenzoyl peroxide.

On the other hand, a catalyst master batch was prepared by extruding a composition consisting of poly(butene-1) having 1.0 of melt index, 1 phr of dibutyltin dilaurate and 2 phr of antioxidant [Irganox 1010 (trade mark)]. The extruder used and extruding conditions were the same as those used in Example 1.

A mixture consisting of 95% by weight of the graft polymer and 5% by weight of the catalyst master batch was extruded by using the extruder used for preparing the catalyst master batch, thereby obtaining an extrudate of strand shape. In this step, the temperatures of the feed section, compression section, metering section and die section of the extruder were maintained at 150° C., 190° C., 200° C. and 200° C., respectively. The extrudate thus obtained was immersed for 4 hours in hot water maintained at 80° C. so as to carry out the crosslinking reaction.

Gel fraction of the crosslinked material was found to be 63%.

CONTROL 4

A crosslinked material was obtained in line with Example 4 except that 0.5 phr of dicumyl peroxide was substituted for the dibenzoyl peroxide used in Example 4. In this case, gel fraction of the crosslinked material was as low as 21%.

EXAMPLE 5

3.0 g of γ-methacryloyloxy propyl trimethoxy silane, 0.3 g of dibenzoyl peroxide, and 0.3 g of dibutyltin dilaurate were added to and fully mixed with 100 g of poly(4-methyl pentene-1) resin powder having a melt index of 4.0 and particle size of less than 100 meshes. The mixture was put in a flask having an inner volume of 500 ml and heated for 20 minutes by placing the flask in an oil bath maintained at 125° C. In this step, nitrogen gas was passed through the flask at the rate of 10 ml/min. Then, the flask was purged by nitrogen gas and immersed for 10 minutes in an oil bath maintained at 250° C. so as to melt the mixture housed in the flask.

Part of the molten mixture was immersed for 5 hours in boiling water of 100° C. so as to carry out the crosslinking reaction.

Gel fraction of the crosslinked material was as high as 73%. Further, the crosslinked material was very flexible.

CONTROL 5

A crosslinked material was produced as in Example 5 except that 0.3 g of t-butyl perpivalate was substituted for the dibenzoyl peroxide used in Example 5. In this case, gel fraction of the crosslinked material was as low as 25%. Further, the produced crosslinked material was rigid.

EXAMPLE 6

2.3 phr of vinyl trimethoxy silane and 0.5 phr of dibenzoyl peroxide were added to the propylene-ethylene copolymer, which was powdery, had a melt index of 4 and contained 9% by weight of ethylene component. The composition thus prepared was extruded through a nozzle 2 mm in diameter, of an extruder of single screw type having a diameter of 40 mm and a length-to-diameter ratio (L/D) of 28, thereby obtaining a graft polymer extrudate. The screw of the extruder was a full flight screw of rapid compression type having a compression ratio of 4. The cylinder of the extruder was divided into three equal sections along the length thereof for the purpose of temperature control. Specifically, the temperatures of these three sections were maintained at 120° C., 180° C. and 200° C., respectively, starting with the temperature of the feed section of the extruder.

The volume ratio of oxygen to the resin composition was found to be 0.02 when calculated from the bulk density of the resin composition in the compression part of the extruder.

On the other hand, a catalyst master batch of the same composition as in Example 1 was prepared as in Example 1.

A mixture consisting of 90% by weight of the graft polymer and 10% by weight of the catalyst master batch was extruded by using the extruder used for preparing the graft polymer, thereby obtaining an extrudate of strand shape. In this step, the temperatures of the feed section, compression section, metering section and die section of the extruder were maintained at 160° C., 200° C., 220° C. and 220° C., respectively. The resultant extrudate was immersed for 3 hours in hot water maintained at 90° C. so as to carry out the crosslinking reaction.

Gel fraction of the crosslinked material was as high as 76%.

CONTROL 6

A crosslinked material was produced as in Example 6 except that dicumyl peroxide was substituted for the dibenzoyl peroxide used in Example 6. In this case, gel fraction of the crosslinked material was as low as 14%.

EXAMPLE 7

A graft polymer and a catalyst master batch were prepared as in Example 1 except that a propylene-ethylene block copolymer containing 13% by weight of ethylene component was substituted for the copolymer used in Example 1.

A mixture consisting of 90% by weight of the graft polymer and 10% by weight of the catalyst master batch was extruded at 200° C. (resin temperature) by using an extruder into a sheet having a thickness of 2 mm and a width of 500 mm, followed by immersing the sheet for 4 hours in hot water maintained at 90° C. so as to carry out the crosslinking reaction. Gel fraction of the crosslinked sheet was found to be as high as 86%.

Further, the crosslinked sheet had a very smooth surface.

On the other hand, the starting material of the copolymer was directly molded into a sheet having the same size as in the above mentioned sheet. The bending modulus, impact resistance and brittle temperature of the crosslinked sheet and the sheet of the starting material copolymer were as follows:

|  | Bending Modulus | Brittle Temperature | Izod Impact strength |
|---|---|---|---|
| Crosslinked Sheet | 7900 kg/cm$^2$ | −42° C. | 41 kg · cm/cm$^2$ |
| Non-Crosslinked Sheet | 9500 kg/cm$^2$ | −18° C. | 20 kg · cm/cm$^2$ |
| Test Method | ASTM D-790 | ASTM D-746 | ASTM D-256 |

The above table shows that the crosslinked material is prominently advantageous in flexibility, impact resistance and brittle temperature.

EXAMPLE 8

2.8 phr of γ-methacryloyloxy propyl trimethoxy silane, 1.4 phr of 50% dioctyl phthalate solution of dibenzoyl peroxide, and 0.15 phr of dibutyltin dilaurate were added to propylene-ethylene rubber containing 42% by weight of ethylene component. The composition thus prepared was kneaded by using a roll mill at a temperature below 50° C. and, then, pressed into a sheet 1 mm thick, followed by pelletizing the sheet. The resultant pellets were extruded at 180° C. (the temperature of the compression and metering sections) by using the extruder used in Example 1 so as to obtain a graft polymer extrudate of strand shape having a diameter of 2 mm. During extrusion, the interior of the hopper of the extruder was maintained at a vacuum of 150 torr.

The graft polymer extrudate was immersed for 2 hours in hot water maintained at 90° C. so as to carry out the crosslinking reaction. Gel fraction of the crosslinked material was as high as 82%.

CONTROL 7

A graft polymer extrudate was prepared frist as in Example 8 except that 1.4 phr of 50% dioctylphthalate solution of dicumyl peroxide was used as the radical generating agent in place of dibenzoyl peroxide and the hopper of the extruder was not evacuated during extrusion.

As in Example 8, the resultant extrudate was immersed for 2 hours in hot water maintained at 90° C. so as to carry out the crosslinking reaction. Gel fraction of the crosslinked material was as low as 28%. When the crosslinking treatment was continued for additional 3 hours, totalling 5 hours of treatment, the gel fraction was increased to 38%. The crosslinking treatment was further continued, but no additional increase in gel fraction was recognized.

EXAMPLE 9

Crosslinked materials (A), (B), (C) were produced as in Example 8 except that the resin compositions were extruded at 160° C., 220° C. and 240° C. (the temperature of the compression and metering sections) in the graft reaction step for cases (A), (B), (C), respectively. Gel fractions of the crosslinked material (A), (B), (C) were 51%, 85% and 53%, respectively.

Examples 8 and 9 jointly indicate that a preferred graft reaction temperature ranges between 180° C. and 220° C.

EXAMPLE 10

A resin composition consisting of 100 parts by weight of a propylene-ethylene random copolymer powder having a melt index of 3 and containing 2% by weight of ethylene component, which had been dried for 24 hours in a vacuum dryer, 3 parts by weight of γ-methacryloyloxy propyl trimethoxy silane and 0.25 part by weight of dibenzoyl peroxide was fully mixed by using a Henschel mexer. The mixture was extruded at 210° C. (the temperature of the compression and metering sections) by using an extruder, with the air within the hopper of the extruder replaced by nitrogen gas, so as to obtain a graft polymer strand-shaped extrudate. Then, the extrudate was pelletized by using a strand cutter.

On the other hand, a composition consisting of 100 parts by weight of a propylene-ethylene random copolymer powder having 1.0 of melt index and containing 2.0% by weight of ethylene component, 50 parts by weight of azodicarbonamide (foaming agent), and 1.25 parts by weight of dibutyltin dilaurate was fully mixed by using a Henschel mixer. The mixture was kneaded by using a roll mill and, then, pressed into a sheet, followed by pelletizing the sheet.

A mixture consisting of 4 parts by weight of the above mentioned graft polymer and 1 part by weight of the pelletized mixture containing the foaming agent and catalyst was extruded at 175° C. (resin temperature) by using an extruder so as to obtain a sheet-like extrudate.

After immersed for 2 hours in boiling water of 100° C., the sheet-like extrudate was foamed in a foaming oven, thereby obtaining a foamed mass having uniform fine cells. The density of the foamed mass was 0.048 g/cm$^3$.

The foamed mass was immersed in titralin heated to 135° C. so as to measure the gel fraction of the foam, with the result that the gel fraction was as high as 83%.

We claim:

1. A method of crosslinking poly-α-olefin series resins, comprising the steps of
    subjecting a resin composition to graft reaction under a volume ratio of oxygen to the resin composition set at less than 0.1 and at temperatures ranging between the thermal decomposition temperature of the radical generating agent and 230° C., said composition comprising at least one kind of poly-α-olefin series resin selected from the group consisting of polypropylene series resin, poly(butene-1) series resin and poly(4-methyl pentene-1) series resin; a radical generating agent selected from the group consisting of dibenzoyl peroxide and t-butyl perbenzoate; and a silane compound having the general formula of RR'SiY$_2$, where "R" is a monovalent olefinically unsaturated (i) hydrocarbon group or (ii) hydrocarbonoxy group, "Y" is an organic group capable of hydrolysis, and "R'" is a monovalent hydrocarbon group except aliphatic unsaturated hydrocarbon groups, or the group "Y" or "R" defined above, and
    brining the resultant graft polymer into contact with water so as to cause crosslinking reaction under the action of a silanol condensation catalyst added to the reaction system before or after the graft reaction step.

2. The method according to claim 1, wherein dibenzoyl peroxide is used as the radical generating agent.

3. The method according to claim 1 or 2, wherein the amount of the radical generating agent ranges between 0.05 phr and 10 phr.

4. The method according to claim 1 or 2, wherein the silane compound is selected from the group consisting of γ-methacryloyloxypropyltrimethoxy silane, vinyltrimethoxy silane and vinyltriethoxy silane.

5. The method according to claim 3, wherein γ-methacryloyloxypropyltrimethoxy silane is used as the silane compound.

6. The method according to claim 1, wherein the amount of the silane compound ranges between 0.5 phr and 20 phr.

7. The method according to claim 1, wherein propylene homopolymer is used as said poly-α-olefin series resin.

8. The method according to claim 2, wherein said poly-α-olefin series resin is a copolymer consisting of at least 50% by weight of propylene component and the balance of at least one other olefin α-olefin.

9. The method according to claim 1 or 2 or 6, wherein said poly-α-olefin series resin is a propylene-ethylene copolymer consisting of 1 to 15% by weight of ethylene component and 99 to 85% by weight of propylene component.

10. The method according to claim 1, wherein the poly-α-olefin series resin is powdery.

11. The method according to claim 1 or 2, wherein the radical generating agent is added to the graft reaction system in the form of a solution prepared by dissolving said radical generating agent in an organic solvent.

12. The method according to claim 1 or 2, wherein the graft reaction is carried out at temperature of from 180° C. to 220° C.

13. The method according to claim 1, wherein hot water is used as the water.

14. The method of claim 12 wherein said volume ratio is less than 0.05, wherein said silane compound is selected from the group consisting of γ-methacryloyloxypropyltrimethoxy silane, vinyltrimethoxy silane and vinyltriethoxy silane, and wherein said poly-α-olefin series resin is a propylene-ethylene copolymer consisting of 1 to 15% by weight of ethylene component and 99 to 85% by weight of propylene component.

15. The method according to claim 14 wherein between 0.5 phr and 20 phr of γ-methacryloyloxypropyltrimethoxy silane is used as the silane compound.

* * * * *